United States Patent
Zhao et al.

(10) Patent No.: US 10,252,290 B2
(45) Date of Patent: Apr. 9, 2019

(54) ROOM TEMPERATURE FAST CURE COMPOSITION FOR LOW ODOR FLOOR COATING FORMULATIONS

(71) Applicant: Dur-A-Flex, Inc., East Hartford, CT (US)

(72) Inventors: Ming Zhao, East Longmeadow, MA (US); David Royston Hughes, Fairfield, CT (US); Murty Venkata Bhamidipati, Simsbury, CT (US); Kyle Sanford Smith, South Windsor, CT (US); Ronald Joseph Phillips, West Simsbury, CT (US)

(73) Assignee: Dur-A-Flex Inc., East Hartford, CT (US)

( * ) Notice: Subject to any disclaimer, the term of this patent is extended or adjusted under 35 U.S.C. 154(b) by 192 days.

(21) Appl. No.: 15/218,034

(22) Filed: Jul. 24, 2016

(65) Prior Publication Data

US 2017/0029653 A1 Feb. 2, 2017

Related U.S. Application Data

(60) Provisional application No. 62/200,067, filed on Aug. 2, 2015.

(51) Int. Cl.

| C09D 133/12 | (2006.01) |
| B05D 3/00 | (2006.01) |
| C09D 5/00 | (2006.01) |
| C08F 290/06 | (2006.01) |
| C08F 265/06 | (2006.01) |
| C09D 4/06 | (2006.01) |
| C09D 175/14 | (2006.01) |
| E04F 15/12 | (2006.01) |

(52) U.S. Cl.
CPC ............ *B05D 3/007* (2013.01); *C08F 265/06* (2013.01); *C08F 290/067* (2013.01); *C09D 4/06* (2013.01); *C09D 5/00* (2013.01); *C09D 133/12* (2013.01); *C09D 175/14* (2013.01); *E04F 15/12* (2013.01)

(58) Field of Classification Search
CPC combination set(s) only.
See application file for complete search history.

(56) References Cited

U.S. PATENT DOCUMENTS

| 3,847,771 A | 11/1974 | McGinniss |
| 3,915,824 A | 10/1975 | McGinniss |
| 4,324,662 A | 4/1982 | Schnell |
| 4,343,919 A * | 8/1982 | Tefertiller ................. C08F 8/00 |
| | | 428/425.1 |
| 4,587,313 A | 5/1986 | Ohta et al. |
| 4,665,106 A | 5/1987 | Ohta et al. |
| 5,003,026 A | 3/1991 | Ehrhart et al. |
| 5,384,341 A | 1/1995 | Itagaki et al. |
| 5,470,425 A | 11/1995 | Dischoe |
| 5,741,543 A | 4/1998 | Winslow et al. |
| 5,985,990 A | 11/1999 | Kantner et al. |
| 6,165,563 A | 12/2000 | Chandran et al. |
| 6,448,301 B1 | 9/2002 | Gaddam et al. |
| 6,664,306 B2 | 12/2003 | Gaddam et al. |
| 7,049,355 B2 | 5/2006 | Quis et al. |
| 8,007,585 B2 | 8/2011 | Yoshii et al. |
| 8,277,944 B2 | 7/2012 | Matsumoto et al. |
| 2002/0164434 A1 | 11/2002 | Tarvin et al. |
| 2005/0153068 A1* | 7/2005 | Li ......................... C08G 18/222 |
| | | 427/180 |
| 2005/0154111 A1* | 7/2005 | Levitt .................. C08G 18/222 |
| | | 524/424 |
| 2009/0082485 A1 | 3/2009 | Slark et al. |
| 2011/0184125 A1* | 7/2011 | Zhao .................. C08G 18/4288 |
| | | 525/131 |
| 2012/0148833 A1 | 6/2012 | Cao et al. |
| 2015/0191622 A1 | 7/2015 | Zhao et al. |

* cited by examiner

*Primary Examiner* — Erma C Cameron

(74) *Attorney, Agent, or Firm* — Joseph Suhadolnik

(57) ABSTRACT

A low odor, fast curing composition coating composition with improved safety and mechanical properties, which cures readily under ambient conditions comprises a) a reactive polymer, oligomer or prepolymer having pendant acrylate or methacrylate groups, b) low odor acrylate or methacrylate monomers, c) an acrylate or methacrylate crosslinker, d) an isocyanate crosslinker, e) a thermal or photo active initiator, and optionally a reactive diluent and/or bead polymer. The composition is cured through multiple pathways, e.g., peroxide initiated radical curing and urethane step chain polymerization. Flooring and other construction materials coated with the composition are also provided.

17 Claims, No Drawings

ROOM TEMPERATURE FAST CURE COMPOSITION FOR LOW ODOR FLOOR COATING FORMULATIONS

This application claims benefit under 35 USC 119 of the filing date of U.S. Provisional Application No. 62/200,067 filed Aug. 2, 2015, the entire contents of each disclosure are incorporated herein by reference.

Disclosed is a low odor, fast curing composition for floor and construction coatings comprising a) a reactive polymer, oligomer or prepolymer having pendant acrylate or methacrylate groups, b) low odor acrylate or methacrylate monomers, c) an acrylate or methacrylate crosslinker, d) an isocyanate crosslinker, e) a thermal or photo active initiator, and optionally a reactive diluent and/or bead polymer, which composition is cured through multiple pathways, e.g., peroxide initiated radical curing and urethane step chain polymerization.

BACKGROUND

The processing of floor coatings comprising reactive methyl acrylate or methacrylate resins is normally associated with a strong offensive odor and significant air born toxicity. Furthermore, the low flash point and high volatility of methyl (meth)acrylate monomer add costs when it is handled during manufacturing, packaging, transportation and application. The term "(meth)acrylate" is used throughout this application to mean "acrylate or methacrylate".

Polymerization of a mixture comprising methyl (meth) acrylate monomers, and a non-reactive (meth)acrylate bead polymer with an amine synergist, a peroxide initiator such as benzoyl peroxide, and wax as an oxygen barrier to form a (meth)acrylate floor coating resin has been broadly practiced in flooring and construction industry. The advantage of this technology is that it can be completely cured in one hour, whereas other coatings typically require much longer times, often six hours or more. Cured acrylate films exhibit excellent chemical and abrasion resistance, but many such coatings have issues with odor, volatility, toxicity and flammability.

Low-odor (meth)acrylate coating systems are known. Controlling the odor, in many instances, also somewhat lowers the toxicity as many of the volatiles responsible for the odor also contribute to the toxicity. Many of the low odor coatings however are prepared using only slightly higher MW monomers because incorporation of larger compounds, such as higher oligomers and polymers, often complicate application of the coating, especially in low solvent or solvent free coatings. Even for these low odor systems it is still difficult to achieve 100% cure while maintaining the good balance between the work time and curing time, and health risks often remain a concern. The need for a low-odor, environmentally friendly, non-flammable, cold-curing (meth)acrylate reactive resin composition for a floor coating with low health risks during application remains.

Historically, coating materials comprising thermoplastic and thermosetting polymers were applied from solvents that were subsequently removed by evaporation. However, changing safety, health and environment legislation have restricted solvent emissions and solvent-free coating materials and lacquers have become much more common.

UV curable coatings offer fast curing compared to other methods, such as moisture curing or thermal curing. Typical UV lacquers or varnishes are applied at room temperature and often comprise epoxy acrylate, polyester acrylate or urethane acrylate oligomers combined with acrylate functional monomers in the presence of photoinitiators. Under suitable UV wavelengths, the photoinitiators produce free radicals, which polymerize the acrylate functional groups to produce a cross-linked network. The relatively high concentrations of low viscosity reactive monomers often employed to reduce the viscosity of the coating composition in order to get good flow and leveling at room temperature can penetrate too deeply into porous substrates such as wood to be efficiently cured by UV radiation. Furthermore, UV curable films typically only cure well at low film thicknesses, e.g., 2 to 3 mils or less, with thicker films exhibiting surface flaws and other failures. Uncured monomer in the pores of substrates can lead to safety, health and environmental problems, e.g., when the materials are cut or sanded.

The use of a solvent-free reactive hot melt layer based on polyurethanes and hardened by atmospheric humidity has been suggested. While this method has the advantage that desired layer thicknesses can be applied in a single operation, full curing can take least several days to occur and the coated part cannot be processed or packaged rapidly.

Hot melt compositions that can be cured through both radiation and moisture or by applying a UV curable lacquer on top of the moisture curable hot melt are known. Generally the coating is partially cured by UV radiation, typically the top layer of portion of the coating, but full cure of the full coating may still take several days. Heating the hot melt composition prior to application also tends to limit thermal stability and can result in moisture from the atmosphere penetrating the composition and reacting with reactive functional groups, e.g., isocyanate groups. This leads to an increase in molecular weight while on the roller causing application problems, e.g., stringing or filament formation that can produce fouling of substrates/application equipment.

US 2009/0082485 discloses radiation curable hot melt coating compositions and articles comprising them. Typical compositions comprise a polymer component with number average molecular weight (Mn)>2,000 g per mole comprising polyurethane and/or poly(meth)acrylate segments and having at least one functional group polymerisable under UV radiation; an oligomeric component with Mn=500 to 5,000 g per mole comprising at least two functional groups polymerisable under UV radiation; at least one photoinitiator; and optionally either in place of or in addition to the oligomeric component, a monomer component with Mn=100 to 1,000 g per mole with at least one functional group polymerisable under UV radiation.

U.S. Pat. No. 7,049,355 discloses a low odor thermal curable floor coating formulation comprising low volatile methacrylate monomers, a non-reactive bead polymer, a paraffin and/or wax, and a redox system, containing an accelerator and a peroxide catalyst or initiator in an amount adequate for cold-curing the methacrylate monomers.

Co-pending U.S. patent application Ser. No. 14/584,344, discloses a curable, low odor, liquid coating composition, which is readily applied at room temperature without heating, useful, for example, as a coating for flooring applications, comprising a) a reactive acrylic based polymer comprising pendant acrylate or methacrylate groups; b) reactive unsaturated monomers, e.g., acrylic or methacrylic monomers; c) a thermal or UV activated radical initiator; d) an inert and non-polar wax or viscous oil, e.g., and e) optionally a tertiary amine accelerator used with a thermally activated radical initiator.

Safe, fast curing coating compositions with less toxicity, decreased flammability and better physical properties are still needed. The present invention provides coating compositions that are capable of curing via multiple pathways, e.g., free radical polymerization of (meth)acrylate moieties and urethane step chain polymerization of isocyanates, which compositions when cured exhibit improved strength and mechanical properties. The coating compositions of the present invention are readily applied, cure quickly and safely and are ideally suited for floor coatings and other industrial applications.

SUMMARY OF THE INVENTION

In general, the low odor, fast curing, multi-cure coating composition of the invention comprises the following components:

a) a reactive polymer/oligomer/prepolymer with (meth) acrylate pendant groups capable of radical polymerization catalyzed by an organic peroxide and/or UV-photo initiator;

b) a low odor (meth)acrylate monomer;

c) a low odor, multifunctional (meth)acrylate functional crosslinker;

d) a multifunctional isocyanate, i.e., di-, tri- or polyisocyanate;

e) a thermal and/or photo-initiator;

f) a wax; and g) an amine catalyst and/or inhibitor.

In many embodiments the coating composition will also comprise a reactive diluent and/or a non-reactive bead polymer. The composition of the invention may also comprise one or more additives common in the art such as a defoamer, air releasing agent, flow leveling modifier, rheology modifier, anti-slip agent, plasticizer, catalyst, delaying agent, wetting agent, pigment and dye, gloss and matting agent, fillers, sands, cement, glass beads, rubber chips, vinyl or any decorated chips, silica powder, porcelain powder, wax, solvent, lime, aluminum oxide particles, fibers including minifibers, etc.

A peroxide, for example an organic peroxide such as benzoyl peroxide, is added to the coating composition prior to application to a substrate, in many cases a few minutes or less before application, in some embodiments one minute or less before application to a substrate.

Components described as low odor are obviously those with a relatively low vapor pressure, making them not only less offensive to smell, but safer as the concentration of possibly harmful materials is kept to a minimum and obtaining proper levels of ventilation are readily achieved. In general, a low odor component of the present coating composition has a boiling point at 1 atmosphere of greater than 105° C.

The coating of the invention is readily applied using conventional methods and can be completely cured within 30 minutes to 1 hour. The coating can be used as a primer, sealer, patch, intermediate coat, broadcast coat, top coat, clear or pigmented coating, etc.

DESCRIPTION OF THE INVENTION

The coating composition of the invention is a liquid when mixed, which liquid may or may not contain suspended solid particles of optional components such as pigments, fillers etc., and comprises, by weight based on the total weight of the components a) through i), a) from 5 to 90%, e.g., from 20 to 60%, e.g., 25 to 45% of a reactive polymer, oligomer or prepolymer with (meth) acrylate pendant groups capable of radical polymerization initiated by an organic peroxide and/or UV-photo initiator;

b) from 1 to 90%, e.g., from 5 to 80% or 5 to 60%, e.g., 25 to 45% of a low odor (meth)acrylate monomer having a boiling point at one atmosphere of greater than 105° C.;

c) from 1 to 80%, e.g., from 10 to 60%, e.g., 15 to 35% of a low odor, multifunctional (meth)acrylate functional crosslinker having a boiling point at one atmosphere of greater than 105° C.;

d) from 1 to 25%, e.g., from 1 to 15%, e.g., 2 to 10% of a multifunctional isocyanate, i.e., di-, tri- or polyisocyanate;

e) from 0.1 to 15%, e.g., from 1 to 10%, e.g., 1 to 6% of a thermal and/or photo-initiator;

f) from 0.1 to 10%, e.g., from 0.1 to 5%, e.g., 0.2 to 3% of a wax;

g) from 0.1 to 5%, typically from 0.1 to 2% of an amine catalyst and/or inhibitor;

h) from 0 to 50%, e.g., from 1 to 20%, e.g., 2 to 15% of a reactive diluent comprising an alcohol or other functional groups capable of reacting with an isocyanate; and i) from 0 to 50%, e.g., from 5 to 20% of a non-reactive (meth)acrylate bead polymer.

In order to cure the composition, a peroxide, e.g., benzoyl peroxide, is added to the composition shortly before application to a substrate.

The coating composition may also comprise up to 20% typically 10% or less, of other components common in such coatings, e.g., colorants, fillers, stabilizers and additives, typically however, the composition will comprise little or no volatile solvents that are removed by evaporation after application before or during cure. The viscosity of the coating can be adjusted by addition of a reactive diluent of component g), which reacts into the coating on cure.

The coating composition of the invention comprises at least components a) through g). Components h), i) and other additives are optional and their presence will depend on the application.

The present coating composition is readily prepared, for example, by mixing via standard techniques, in any order, a) through g) along with any optional components to provide a flowable composition. A peroxide is added to this composition prior to application and curing. The composition containing the peroxide is pourable and can be applied to a substrate via any standard coating technique including spraying, brushing etc, or can be poured onto a substrate and spread or leveled using conventional application tools such as a brush, roller, squeegee etc. The coating can be cured at room temperature within an hour, often faster.

The coating composition of the invention cures through both conventional radical polymerization of (meth)acrylate functionality with peroxide initiators, which can be aided by the presence of thermal initiators, photo initiators, and/or amine catalysts, and additionally cures via crosslinking reactions involving isocyanates and isocyanate reactive functionality comprised by the reactive polymer/oligomer/ prepolymer, low odor monomer, and/or multifunctional acrylate. It is presumed that the additional reactions with the isocyanates of the invention are at least partially responsible for the improved mechanical properties.

The peroxide added to the formulated composition before cure is typically an organic peroxide, for example, an organic hydroperoxide, alkyl peroxide, acyl peroxide, peroxy ester, ketone peroxide and the like. For example, some commonly encountered organic peroxides include tert-butyl peroxide, tert-butyl hydroperoxide, cumyl hydroperoxide, dicumyl peroxide, dibenzoyl peroxide, methyl ethyl ketone peroxide, acetylacetone peroxide, methyl isobutyl ketone peroxide, cyclohexanone peroxide, tert-butyl peroxybenzoate, tert-butyl peroxyisopropyl carbonate, etc. Dibenzoyl peroxide has been used to good advantage.

The coatings of the invention can be applied to a wide variety of materials such as, e.g., wood, concrete, masonry, metals, plastics, composites and the like, and are very effective as coatings for flooring including coating a fully installed floor, or coating materials that are used in assembling a floor such as tiles, concrete slabs, planks, polymeric sheets etc.

Component a), the reactive polymer/oligomer/prepolymer with (meth)acrylate pendant groups of the invention can be any compatible (meth)acrylate functional polymer, oligomer or prepolymer containing any number of methacrylate groups. In some embodiments, the reactive polymer/oligomer/prepolymer can also contain other additional functional groups, especially those capable of reaction with isocyanates, such as hydroxyl groups, amino groups and the like. In some embodiments, the oligomer/prepolymer with methacrylate pendant groups may also comprise isocyanates as additional pendant groups.

The polymer may be, e.g., a polyurethane, polyurea, polyether, polyester, acrylic polymer, etc., comprising two or more pendant acrylate or methacrylate groups, e.g., acrylate or methacrylate end groups, which may be commercially available or prepared via known means.

For example, in some embodiments the reactive polymer/oligomer/prepolymer is a polyurethane prepared from a polyol, such as a alkane polyol, polyether polyol, polyester polyol, etc.; a polyisocyanate, such as an aliphatic or aromatic di or tri isocyanate; and an optional polyol or polyamine cross-linker, which polyurethane bears pendant acrylate or methacrylate end groups, and/or multiple pendant acrylate or methacrylate groups attached to the interior of the polymer chain. For example, commercial reactive polymers include polyurethane di-acrylate, tri-acrylate, di-methacrylate or tri-methacrylate materials such as the di-methacrylate DYMAX BOMAR® BR-571MB.

As another example, in some embodiment the reactive polymer/oligomer/prepolymer is a (meth)acrylic based polymer comprising acrylate or methacrylate pendant groups, such as disclosed in co-pending U.S. patent application Ser. No. 14/584,344, formed by reacting a co-polymer formed from acrylic and/or methacrylic ester monomers and at least one of an acrylic and/or methacrylic acid, with an epoxyalkyl acrylate or methacrylate ester, e.g., glycidyl acrylate and/or glycidyl methacrylate. The co-polymer reacted with the epoxyalkyl acrylate or methacrylate ester can be a commercially obtained acrylate or methacrylate polymer comprising a portion of carboxylic pendant groups, or it can be prepared, for example, by the process found in U.S. patent application Ser. No. 14/584,344.

For example, the co-polymer can be prepared by polymerizing, along with acrylic and/or methacrylic acid monomers, any of a variety of acrylate and methacrylate esters including methyl analogues, e.g., crotonate and isocrotonate esters, as well as suitable di-, tri-, and tetra-esters. For example, useful ester monomers include compounds of Formulas Ia and IIa

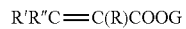
$$R'R''C=C(R)COOG \qquad \text{Ia}$$

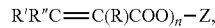
$$R'R''C=C(R)COO)_n-Z, \qquad \text{IIa}$$

wherein R, R' and R'' are independently selected from methyl and hydrogen;

G is $C_{1-18}$, $C_{1-12}$, $C_{1-8}$, or $C_{1-6}$ straight or branched chain saturated alkyl; $C_{2-12}$, $C_{2-8}$, $C_{2-6}$ straight or branched chain unsaturated alkyl; said alkyl or unsaturated alkyl substituted by OH, OR, $NR_2$ and/or interrupted by one or more carbonyl, carboxylate, O or NR; $C_{3-12}$ epoxyalkyl; phenyl; phenyl substituted by alkyl, alkoxy or amino; benzyl; benzyl substituted by alkyl, alkoxy or amino; phenethyl; phenethyl substituted by alkyl, alkoxy or amino alcohol; and the like; n is 2 or 3, e.g., 2; and Z is straight or branched chain $C_{2-12}$alkyl or $C_{2-12}$alkyl substituted by OH, OR, or $NR_2$ and/or interrupted by one or more carbonyl, carboxylate, O or NR, e.g., $C_{4-24}$ alkyl or $C_{4-24}$alkyl substituted by OH, OR, $NR_2$ and/or interrupted by one or more carbonyl, carboxylate, C or NR.

Useful monomers of formula Ia include for example methyl, ethyl, propyl, butyl, pentyl, hexyl, heptyl, octyl, nonyl, decyl, dodecyl, octadecyl, phenyl, benzyl, hydroxyethyl, hydroxypropyl, aminoethyl, aminopropyl, glycidyl, ethoxyethyl, diethoxyethyl, propoxypropyl, acrylate or methacrylate esters and the like including alkyl isomers such as iso-propyl esters, tert-butyl esters, ethylhexyl esters etc.

Useful monomers of formula IIa useful include di- or tri-acrylate or methacrylate esters of ethanediol, propanediol, butanediol, hexanediol, octanediol, nonanediol, decanediol, eicosanediol, diethylene glycol, triethylene glycol, tetraethylene glycol, dodecaethylene glycol, tetradecaethylene glycol, propylene glycol, dipropylene glycol, and tetradecapropylene glycol, trimethylopropane, glycerin etc.

Small amounts of other monomers, e.g., 0 to 15 mol %, may be copolymerized with the above-indicated acrylates etc., for example, acrylamides, vinyl esters, vinyl chlorides, vinyl ethers, vinylidene chlorides, vinyl acetates, styrenes, maleic acid derivatives, dienes and the like, including, for example: 1,3-butadiene, isobutylene, ethylene, propylene, vinyl chloride, tetrafluoroethylene, divinylbenzene, 4-vinylbiphenyl, vinylidene chloride, 4-vinylpyridine, chloroprene, vinyl 2-ethylhexanoate, vinyl acetate, cyclohexyl vinyl ether, dodecyl vinyl ether, ethyl vinyl ether, isobutyl vinyl ether, isopropyl vinyl ether, octadecyl vinyl ether, octyl vinyl ether, pentyl vinyl ether, phenyl vinyl ether, propyl vinyl ether, n-butyl vinyl ether, t-butyl vinyl ether, vinyl pyrrolidinone, styrene, alpha-methylstyrene, o, m, or p-methyl styrene, p-isopropylstyrene, p-t-butylstyrene, o, m or p-chlorostyrene, o p-bromostyrene, p-fluorostyrene, allyl alcohol, allylglycidal ether, allylphenyl ether, sodium 1-allyloxy-2 hydroxypropylsulfonate, dimethylisopropenyloxazolone, acrylamide, acetoneacrylamide; methacrylamide, dibutylacrylamide, methylolacrylamide octylacrylamide, octadecylacrylamide, t-butylacrylamide, sodium acrylate, sodium methacrylate, 2-Cyanoethyl Acrylate, acrylic anhydride, methacrylic anhydride, acrylonitrile, methacrylonitrile, acryloyl chloride, methacryloyl chloride, acrylanilide, citraconic anhydride, itaconic acid, itaconic anhydride, diethyl fumarate, dimethyl fumarate, ethyl fumarate, polyethylenefumarate, maleic acid, maleic anhydride, maleimide, butyl maleimide, methyl maleimide, ethyl maleimide, hexyl maleimide, octylmaleimide, propyl maleimide, maleonitrile, methyl maleate, dibutyl maleate, diallylmaleate, ethyl maleate, and the like, including isomers and variants obvious to one skilled in the art.

There is no particular limit on the MW of, the reactive polymer/oligomer/prepolymer, for example, polymers with an average molecular weight of from Mn 500 to 500,000 may be used, and in some embodiments larger polymers may be employed. In some particular embodiments of the invention, for example, in certain photo-cured compositions, the reactive acrylic polymer has an average molecular weight of less than Mn 5,000, MN 3,000 or Mn 2,000, for example, an average molecular weight of Mn 1,900 or less, e.g., 1,800 or less, 1,700 or less or 16,00 or less, e.g. from 500 to 1,900.

Component b), the low odor methacrylate monomer having a boiling point at one atmosphere of greater than 105° C. may be one or more of any low odor methacrylate monomer comprising functional groups such as isocyanate, hydroxyl, acid, amine or any other functional group which can react with isocyanates. Typical examples are HEMA, HPMA, HBMA, etc.

For example, useful reactive monomers may have a boiling point at 1 atmosphere of greater than 110° C., for example, 120, 130, 140, 145 or 150° C. or higher, in some embodiments greater than 160° C., 170° C. or 180° C. In many embodiments, the reactive monomers have a molecular weight of less than 1000, often less than 500.

For example, useful reactive monomers include compounds of formula I and compounds comprising two or more reactive groups of formula II,

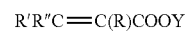   I

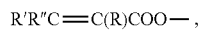   II wherein R, R' and R" are each individually selected from H, $C_{1-12}$ alkyl, $C_{1-6}$ alkyl substituted by phenyl, $C_{1-6}$ alkyl substituted by phenyl substituted by one or more $C_{1-4}$ alkyl, phenyl, and phenyl substituted by one or more $C_{1-4}$alkyl, e.g., R, R' and R" are independently selected from methyl and hydrogen;

and Y is H or is $C_{1-18}$, $C_{1-12}$, $C_{1-8}$, or $C_{1-6}$ straight or branched chain saturated alkyl or $C_{2-12}$, $C_{2-8}$, $C_{2-6}$ straight or branched chain unsaturated alkyl wherein said alkyl or unsaturated alkyl substituted by OH, OR, $NR_2$, $C_{3-12}$ epoxyalkyl, and/or interrupted by one or more carbonyl, carboxylate, O or NR, wherein R is as described above, in many embodiments Y selected from H and $C_{1-12}$ alkyl substituted by phenyl, OR, NRR', or oxirane, i.e., and epoxy group, and/or interrupted by carbonyl, carboxylate, O or NR.

In many embodiments, in the compounds of formula I and those comprising two or more groups of formula II, R, R' and R" are each individually selected from H and methyl and Y is selected from $C_{2-6}$alkyl substituted by OR, NRR', or oxirane; and in particular embodiments, R is H or methyl and R' and R" are H, e.g., the reactive monomers comprise acrylate or methacrylate moieties.

In some embodiments a small amount, i.e., less than 10%, of other monomers may also be present as part of component b), for example, acrylamides, vinyl esters, vinyl chlorides, vinyl ethers, vinylidene chlorides, vinyl acetates, certain styrenes, maleic acid derivatives and the like.

Component c) comprises a low odor, multifunctional methacrylate or acrylate crosslinker having a boiling point at one atmosphere of greater than 105° C.; that is, the crosslinker is a monomer comprising two or more methacrylate or acrylate groups. Many such compounds are known in the art and include, for example, di- and tri-acrylates and methacrylates such as trimethyloylpropane trimethacrylate, 2,2-bis-(4-(3-methacryloxy-2-hydroxypropoxy)phenyl-propane, 3,6-dioxaoctamethylene dimethacrylate, 1,4-butanediol dimethacrylate and the like.

Component d), the multifunctional isocyanate may be any known di- or poly-isocyanate including for example, HDI trimer (DESMODUR® N3300) and MDI.

For example, a wide variety of polyisocyanate monomers are known and may be used e.g., aliphatic diisocyanates or aromatic diisocyanates. Common aliphatic diisocyanates include 1,6-hexane diisocyanate (HDI), isophorone diisocyanate (IPDI), and methylene bis(p-cyclohexyl isocyanate) ($H_{12}$MDI), 1,3-cyclohexyl diisocyanate, 1,4-cyclohexyl diisocyanate (CHDI), tetramethylene 1,4-diisocyanate, hexamethylene 1,4-diisocyanate, 2,2,4-trimethyl-hexamethylene diisocyanate (TMDI), and the like.

Typical aromatic diisocyanates include diphenylmethane diisocyanate (MDI), optionally polymeric MDI, 2,4-toluene diisocyanate (TDI), 2,6-toluene diisocyanate, naphthalene diisocyanate (NDI), 3,3'-bitoluene diisocyanate (TODI), diphenyl 4,4'-diisocyanate (DPDI), dibenzyl-4,4'-diisocyanate, 1,3 and 1,4-xylene diisocyanates, tetramethylxylylene diisocyanate "TMXDI), para-phenylene diisocyanate (PPDI), stilbene-4,4'-diisocyanate, benzophenone-4,4'-diisocyanate, and the like.

Examples of isocyanate derivatives include ureas, biurets, allophanates, dimers and trimers (such as uretdiones and isocyanurates) of isocyanate compounds and the like.

The curing reaction can be initiated thermally, photochemically or both thermally, photo-chemically, and a wide variety of initiators can be used. That is, component e), the thermal and/or photo-initiator, can be one or more thermally activated, UV activated and/or or visible light activated radical initiators, such as those well known in the art, many of which are commercially available. It is well within the skill of the practitioner to determine the amount of initiator required to achieve proper cure of the coating, but less than 15 wt % and typically 10 wt % or less, e.g., 6 wt % or less, of the composition will be initiator.

Many compounds useful as a thermal or photo-initiator in the present composition are compounds capable of forming radicals via thermal scission, and compounds capable of forming radicals upon exposure to UV or visible light including commercially available diketone, hydroxy ketone, phosphine oxide, hydroxyl phosphine oxide, aromatic ketone UV/Vis photoinitiators. In some cases, the initiator activity is augmented by an amine catalyst, such a tertiary amine or amine based (meth)acrylates, for example an aromatic tertiary amine of Bisomer PTE.

Useful thermal initiators include azo compounds, such as azo bis-isobutyronitrile and the like, and certain perixide compounds and inorganic peroxides, such as ammonium persulfate, potassium persulfate, hydrogen peroxide and the like. Useful catalysts for auto-oxidative cure include the salts of cobalt, such as cobalt acetate, cobalt naphthenate and the like.

Radical producing photo activated initiators that can initiate peroxide cleavage or free-radical polymerization of unsaturated double bonds upon exposure to UV/vis light and high energy visible light are well known. Sources of UV/vis radiation include sunlight, fluorescent lamp, mercury lamp, carbon-arc lamp, xenon lamp and the like, e.g., a mercury vapor lamp. In many embodiments of the invention, ambient light will suffice.

Useful photoinitiators include cleavage-type initiators, halogenated polynuclear ketones, such as chlorosulfonatedbenzanthones, chlorosulfonatedfluorenones, alpha-haloalkylatedbenzanthrones, and alpha-haloalkylatedfluorenone; benzoin, its ethers, such as methyl ether, ethyl ether, isopropyl ether, butyl ether, octyl ether and the like; carbonyl compounds such as diacetyl, benzil and the like; sulfur compounds such diphenyl sulfide, dithiocarbamate and the like; alpha-chloromethyl naphthalene and anthracene. Other useful photoinitiators include alkylphenones and benzophenones. Photoinitiators suitable for pigmented coatings are suggested in U.S. Pat. Nos. 3,915,824 and 3,847,771.

Some specific example of photo fragmentation initiators, include benzoin alkyl ethers, benzilketals, acyloxime esters, and acetophenone derivatives, including dialkoxyacetophenones, hydroxyl alkyl ketones, morpholinoketones, chlorinated acetopheneones, acylphosphine oxides and acyl phosphonates. Examples of type 2 photoinitiators, i.e., hydrogen abstraction photoinitiators, include benzil and derivatives, benzophenone and derivatives, and thioxanthones. Specific examples of photo initiators are benzyldimethylketal, bis(2,6-dimethoxy benzoyl)(2,4,4-trimethyl pentyl)phosphine-oxide, 2-hydroxy-2-methyl-1-phenyl-1-propanone, diphenyl (2,4,6-trimethylbenzoyl) phosphine oxides, 1-hydroxycyclohexyl phenyl ketone, 2-benzyl-2-(dimethylamino)-1-) 4-(4-morpholinyl)phenyl-1-butanone, isopropylthioxanthone, alpha-alpha-dimethoxy-alpha-phenyl-acetophenone, 2-methyl-1-4-(methylthio)phenyl-2-(4-morpholinyl)-1-propanone, 2,2-diethoxyacetophenone, 2-hydroxy-1-4-(hydroxyethoxy)phenyl-2-methyl-1-propanone. Polymer bound photo initiators may be used and often combinations of photo initiators are employed. Commercial examples of photo initiators are well known and readily obtained.

The wax used in the invention as component f) is any wax selected to rise to the surface of the coating either before or during cure to create an oxygen barrier that enables complete free radical curing by preventing oxygen quenching of the radicals. It may be a paraffin wax or any wax that is incompatible enough with the formulations so they can migrate to the top of the coating surface during the curing and form an oxygen inhibition layer. An inert gas blanket cross the film can also be used to replace the wax to achieve the similar oxygen inhibition effect but it is not practical and economical. The wax will remain after cure but erosion due to exposure to traffic will cause to wax or to wear away. The oxygen barrier is most important in thicker films.

In principle, any inert substance that forms a homogeneous surface layer formation before or during cure can be used, for example, a paraffin, microcrystalline wax, carnauba wax, beeswax, lanolin, a polyolefin wax, ceresin, candelilla wax, etc., and it is possible that a heavy oil can be used. Typically, a paraffin wax is used, in one particular embodiment a paraffin wax with a melting point of from 70 to 200° F., e.g., from 100 to 180° F., or from 110 to 150° F., is used.

The tertiary amine of component g) is used as an accelerator for the radical initiator, in particular for thermal initiators such as peroxides. The amines are known and typically commercially available, including various aromatic tertiary amine, such as dimethyl-p-toluidine, diisopropoxy-p-toluidine, N-Ethyl-N-(2-hydroxyethyl)-m-toluidine,N,N-bis-(2-hydroxyethyl)-p-toluidine, 4-dimethylaminobenzoic acid and the like, amine acrylates, trialkylamines, etc. A polymerization or radical inhibitor, such as MEHQ or BHT, and polymerization controlling, delaying or temporarily blocking agents such as, e.g., nitroxides may be used to balance the curing rate and film formation time to provide sufficient time to properly apply the composition.

The coating composition is typically 100% active, meaning that little or no inert solvents are employed. However, in some embodiments the coating compositions of the invention will also contain a reactive diluent of optional component h), i.e., a mono- or poly-functional compound comprising an alcohol or other functional groups capable of reacting with an isocyanate. A reactive diluent can be used instead of a typical inert organic solvent to reduce the viscosity of the composition, aid in dissolving or suspending various components, aiding transfer of the composition etc., but is not generally necessary. One advantage of the reactive diluent over the inert solvent is that it is not evaporated from the composition after application, but is reacted into the coating mitigating environmental and safety issues.

As is common in traditional (meth)acrylate coatings, it is possible to incorporate an optional non-reactive bead polymer, component i), into the coating composition of the invention. Any known bead polymer can be used, typically an acrylate or methacrylate polymer is selected.

Coating compositions of the invention also often comprise one or more fillers and/or other additives. These include, for example, organic fillers, inorganic fillers, fibers, minifibers, pigments, dyes, anti-slip agents, anti static agents, adhesion promoters, tackifiers, plasticizers, flow aids, wetting aids, rheology modifiers, nucleating agents, photo synergists, leveling agents, defoamer/air releasing agents, and the like. For example, the coatings may be formulated with cement, aggregates, sands, quartz (colored or non colored), silica, metal salts such as $CaCO_3$, $CaSO_4$, $BaSO_4$, etc., ultraviolet absorbers, hindered amine light stabilizers, antioxidants, surfactants, dispersants, anti slip agents such as $Al_2O_3$, etc.

Any peroxide which can be decomposed and form free radicals at normal conditions to initiate polymerization of (meth)acrylate pendant group may be added to the composition to initiate cure. One embodiment of the invention is the coating composition further comprising an organic peroxide. A typical example is benzoyl peroxide.

The coating composition of the invention is a liquid at room temperature having a viscosity at 25° C. of less than about 50,000 cps, e.g., 20,000 cps or less, such as 15,000 cps or less, generally less than 10,000 cps, for example, from about 50 cps to about 50,000 cps, for example from 50 cps to about 10,000 cps at 25° C., and in certain embodiments the viscosity is from 50 cps to 5,000 cps or from 50 cps to 3,500 cps. It is readily applied to a substrate without heating by conventional, means, e.g., brush, roller, squeegee, trowel, spray, and the like.

The liquid coating composition of the invention can also be broadcasted with sand, quartz, chips, flakes, etc. while it is cured forming a decorative coating.

Single coating layers can be applied or multiple coating layers may be used. Thin films, e.g. 0.5 to 500 microns, and thick films can be prepared, for example, films builds of 60 mils and higher have been prepared by thermal curing a single application layer of the instant composition, and excellent results in UV curing films 15-20 mils have been obtained. Thicker single application film builds are also possible, but multiple layers of the coating are often applied when thicker coatings are desired. For example, by applying multiple coating layers, films of 50 mils, 75 mils, 100 mils or 200 mils etc. can be prepared.

The isocyanate containing coating compositions of the invention have improved mechanical properties when cured as compared to similar coatings that lack the isocyanate crosslinker and traditional methacrylate coatings. This can be seen by comparing a traditional (meth)acrylate coating, an isocyanate containing coating of the invention and a similar coating lacking the isocyanate.

For example, a traditional methacrylate coating composition for comparison was prepared comprising methyl methacrylate monomer, a non-reactive a methyl methacrylate bead polymer ELVACITE® 2697, triethylenedimethacrylate, hydroxyethyl-p-toluidine catalyst and paraffin wax, i.e., Example 1, of the EXAMPLES section of the application. The viscosity of the composition was about 130 cps at 20-25° C.

A coating composition of the invention, i.e. Example 3, comprising a) a polyether urethane acrylate di methacrylate, BOMAR® BR-571MB, as a reactive polymer/oligomer/prepolymer with methacrylate pendant groups;

b) 2-hydroxyethyl methacrylate as a low odor (meth) acrylate monomer;

c) trimethylolpropane trimethacrylate as a low odor, multifunctional (meth)acrylate functional crosslinker;

d) hexamethylene diisocyanate trimer, DESMODUR® N 3300A, as multifunctional isocyanate;

e) IRGACURE® 4265A liquid photoinitiator blend of acyl phosphine oxide/alpha hydroxy ketone as photo-initiator; and f) hydroxyethyl-p-toluidine catalyst and paraffin wax. The viscosity of the composition was about 1070 cps at 20-25° C.

A coating composition similar to the inventive composition Example 3, except without hexamethylene diisocyanate trimer, i.e., Example 2, was also prepared. The viscosity of the composition was about 1070 cps at 20-25° C.

100 grams of each of the coating compositions were mixed for 1 minute with 2.1 to 3.2 g of Perkadox L-40 RPS benzoyl peroxide and the resulting mixture was poured onto a test substrate, leveled and allowed to cure under ambient conditions, typically from 15 to 60 minutes. The IRGACURE® 4265A does not require special UV lamps to initiate cure. The cured coatings had a Shore D hardness of 75. Mechanical properties are shown in the table below.

|  | Compressive Strength psi | Tensile Strength psi | Abrasion mg Loss |
|---|---|---|---|
| Ex 1 Methacrylate comp | 3109 | 3368 | 72 |
| Ex 2 No isocyanate | 6965 | 3274 | 32.5 |
| Ex 3 With isocyanate | 11547 | 4263 | 37 |

The isocyanate free coating Ex 2 has tensile strength comparable to that of the comparison traditional methacrylate coating, but has much higher compression strength and much better resistance to abrasion. The isocyanate containing coating of the invention exhibited similar abrasion resistance to the isocyanate free coating of Ex 2, but has higher tensile strength and much higher compressive strength than the Ex 2 coating.

Adding a reactive diluent to the composition can reduce the viscosity of the uncured coating, but often also has an impact on the cured coating, e.g., the cured coating may lack some of the strength of a coating without the reactive diluent. This is seen in the following comparison:

A coating composition similar to the isocyanate free coating of Ex 2 but also comprising ethanol as a reactive diluent, i.e., Example 4, was prepared having a viscosity of about 200 cps at 20-25° C. Likewise, a coating composition similar to the coating with isocyanate of Ex 3 but also comprising ethanol as a reactive diluent, i.e., Example 5, was prepared having a viscosity of about 210 cps at 20-25° C. The lower viscosities of uncured coatings of Examples 4 and 5 when compared to the uncured coatings of Examples 2 and 3 is clear.

The compositions of Example 4 and Example 5 were mixed with benzoyl peroxide, applied to a substrate and cured as above. The cured coatings had a Shore D hardness of 75 for Example 4 and 73 for Example 5. The cure coatings have lower compressive strength, tensile strength and abrasion resistance than seen for corresponding Examples 2 and 3, but again, the coating comprising the isocyanate, Example 5, had significantly higher compressive strength than that of Example 4 as seen in the table below.

|  | Compressive Strength psi | Tensile Strength psi | Abrasion mg Loss |
|---|---|---|---|
| Ex 4 No isocyanate | 1230 | 1611 | 50 |
| Ex 5 With isocyanate | 7683 | 1678 | 48 |

The effect of including a bead polymer in the coating is seen as follows. A coating composition similar to the isocyanate free coating of Ex 2, but also comprising the non-reactive methyl methacrylate bead polymer ELVACITE® 2697, was prepared, as was an isocyanate containing coating composition similar to that of Ex 3, but also comprising the non-reactive methyl methacrylate bead polymer ELVACITE® 2697, i.e., Example 7. Each uncured composition had a viscosity of about 3300 cps at 20-25° C.

The compositions of Examples 6 and 7 were mixed with benzoyl peroxide, applied to a substrate and cured as above. The cured coatings had a Shore D hardness of 78 for Example 6 and 72 for Example 7. Mechanical properties are shown in the table below. Again, the coating comprising the isocyanate had significantly higher compressive strength.

|  | Compressive Strength psi | Tensile Strength psi | Abrasion mg Loss |
|---|---|---|---|
| Ex 6 No isocyanate | 8000 | 3484 | 35 |
| Ex 7 With isocyanate | 12336 | 3777 | 32 |

In each of the three variants above, the presence of the multifunctional isocyanate, and the presumed crosslinking thereto, produces cured coatings with the significantly greater compressive strength.

Coated articles of the invention include but are not limited to countertops, floors, flooring panels, walls, ceilings, doors, architectural panels, decorative panels, automotive applications, ceramics, tiles, concrete and other masonry.

Floors, such as concrete floors coated by the composition of the invention typically comprise one or more, typically each of the following structural elements:

1) Primer/sealer (coated directly to the concrete)—typically 10 mil to 15 mil;

2) Body coat (can be used alone or broadcasted)—typically 15-100 mils or thicker, one, two or more layers may be applied, in some embodiments multiple layers of 15-50 mils are applied. Broadcast means to apply liquid coatings and then cover the liquid coating either with decorative microchips of vinyl or colored/none colored sands; and 3) Top coat—15-30 mil and sometimes thicker, can comprise one or two such layers.

The coating composition of the invention may be used in any of the structural elements, often all three. For example, floor coatings of present invention can be used as primer, sealer, patch, intermediate coat, broadcast coat and top coat. Techniques for applying the coating include roller coating, curtain coating, spraying and any other common method utilized in the floor and wall coatings.

The formulations are useful in applications requiring low odor, toxicity and viscosity, for example, paints, including wood coatings, polyvinyl chloride flooring, concrete flooring, metals and other common substrates. Embodiments of the invention pertain to the coating compositions, process for preparing the coating compositions, applying the coating compositions and the curing thereof, and articles comprising a coating of the invention.

EXAMPLES

The coating compositions Examples 1-7 comprising the components of Table 1 were prepared using standard mixing techniques.

In the Table:

Bomar®™ BR-571MB is a polyether urethane di-methacrylate available from Dymax Corp.

DESMODUR® N 3300A is solvent-free aliphatic polyisocyanate resin based on hexamethylene diisocyanate (HDI) available from Bayer Corp.

IRGACURE® 4265 is a liquid photoinitiator blend of acyl phosphine oxide/alpha hydroxy ketone available from BASF ELVACITE® 2697 is a methyl methacrylate polymer available from Lucite International

TABLE 1

Coating Formulations

|  | 1 | 2 | 3 | 4 | 5 | 6 | 7 |
|---|---|---|---|---|---|---|---|
| Bomar® BR-571MB | — | 34.0 | 32.6 | 31.1 | 29.7 | 31.1 | 29.8 |
| 2-Hydroxyethyl methacrylate | — | 34.0 | 32.6 | 31.1 | 29.7 | 31.1 | 29.8 |
| Methyl methacrylate | 75.2 | — | — | — | — | — | — |
| Trimethylolpropane trimethacrylate | — | 26.7 | 25.6 | 24.4 | 23.3 | 24.2 | 23.2 |
| TEGDMA | 6.0 | — | — | — | — | — | — |
| Desmodur® N 3300A | — | — | 4.3 | — | 3.9 | — | 4.0 |
| Hydroxyethyl-p-toluidine | 1.0 | 0.9 | 0.9 | 0.8 | 0.8 | 0.8 | 0.8 |
| IRGACURE® 4265 | — | 4.0 | 3.8 | 3.6 | 3.5 | 3.6 | 3.5 |
| ELVACITE® 2697 | 17.0 | — | — | — | — | 8.8 | 8.4 |
| Paraffin wax 125/130 | 0.3 | 0.3 | 0.3 | 0.3 | 0.3 | 0.3 | 0.3 |
| Ethanol | — | — | — | 8.8 | 8.8 | — | — |

To prepare a cured coating, 100 grams of each of the coating compositions above were mixed for 1 minute with 2.1 to 3.2 g of Perkadox L-40 RPS benzoyl peroxide and the resulting mixture was poured onto a test substrate, leveled and allowed to cure under ambient conditions, typically from 15 to 60 minutes. Pot life of each coating was from 5 to 15 minutes, working time was 10 to 20 minutes, cure time for Example 1 was 45 minutes, cure time for Examples 2-7 was 30 to 40 minutes. Viscosity of the uncured coating and mechanical properties of the cured coatings are shown in Table 2.

TABLE 2

Coating Film Properties

| ID | viscos@ 70F cps | Compressive Strength psi | Tensile Strength psi | Abrasion mg Loss | Shore D |
|---|---|---|---|---|---|
| 1 | 133 | 3109 | 3368 | 72 | 75 |
| 2 | 1070 | 6965 | 3274 | 32.5 | 75 |
| 3 | 1065 | 11547 | 4263 | 37 | 75 |
| 4 | 200 | 1230 | 1611 | 50 | 75 |
| 5 | 214 | 7683 | 1678 | 48 | 73 |
| 6 | 3300 | 8000 | 3484 | 35 | 78 |
| 7 | 3250 | 12336 | 3777 | 32 | 72 |

The invention claimed is:

1. A process for coating a floor or material used in preparing a floor, the process comprising applying to the floor or the material used in preparing a floor coating composition comprising, by weight based on the total weight of the components a) through i):
   a) from 5 to 90% of a reactive polymer, oligomer or prepolymer with acrylate or methacrylate pendant groups;
   b) from 1 to 90%, of a (meth)acrylate monomer having a boiling point at one atmosphere of greater than 105° C.;
   c) from 1 to 80% of a multifunctional (meth)acrylate functional crosslinker having a boiling point at one atmosphere of greater than 105° C.;
   d) from 1 to 25% of a multifunctional isocyanate;
   e) from 0.1 to 15% of a thermal and/or photo-initiator;
   f) from 0.1 to 10% of a wax;
   g) from 0.1 to 5% of an inhibitor and/or an amine catalyst;
   h) from 0 to 50% of a reactive diluent comprising a functional group capable of reacting with an isocyanate; and
   i) from 0 to 50% of a non-reactive (meth)acrylate bead polymer; and
   then allowing the coating to cure at room temperature.

2. The process according to claim 1 wherein the coating composition further comprises an organic peroxide.

3. The process according to claim 2 wherein the organic peroxide is benzoyl peroxide.

4. The process according to claim 1 comprising wherein the coating composition comprises
   a) from 20 to 60% of the reactive polymer, oligomer or prepolymer with acrylate or methacrylate pendant groups;
   b) from 5 to 60%, of the (meth)acrylate monomer having a boiling point at one atmosphere of greater than 105° C.;
   c) from 10 to 60% of the multifunctional (meth)acrylate functional crosslinker having a boiling point at one atmosphere of greater than 105° C.;
   d) from 1 to 15% of the multifunctional isocyanate;
   e) from 1 to 10% of the thermal and/or photo-initiator;
   f) from 0.1 to 5% of the wax; and
   g) from 0.1 to 2% of the inhibitor and/or amine catalyst.

5. The process according to claim 4 wherein the coating composition comprises h) from 1 to 20% of the reactive diluent, and/or i) from 5 to 20% of the non-reactive (meth)acrylate bead polymer.

6. The process according to claim 1 wherein the reactive polymer, oligomer or prepolymer with acrylate or methacrylate pendant groups is a polyurethane, polyurea, polyether, polyester, acrylic polymer, comprising two or more pendant acrylate or methacrylate groups.

7. The process according to claim 6 wherein the reactive polymer, oligomer or prepolymer with acrylate or methacrylate pendant groups is a polyurethane comprising two or more pendant acrylate or methacrylate groups.

8. The process according to claim 1 wherein the reactive polymer, oligomer or prepolymer with acrylate or methacrylate pendant groups is a (meth)acrylic based polymer comprising acrylate or methacrylate pendant groups.

9. The process according to claim 8 wherein the (meth)acrylic based polymer comprising acrylate or methacrylate pendant groups is formed by reacting acrylic and/or methacrylic ester monomers and at least one of an acrylic monomer and/or methacrylic acid monomer to form a copolymer, then reacting said copolymer with an epoxyalkyl acrylate or methacrylate ester.

10. The process according to claim 1 wherein the (meth)acrylate monomer having a boiling point at one atmosphere of greater than 105° C. comprises a (meth)acrylate monomer comprising an isocyanate, hydroxyl, acid or amine group.

11. The process according to claim 10 wherein the (meth)acrylate monomer having a boiling point at one atmosphere of greater than 105° C. comprises a (meth)acrylate monomer comprising a hydroxyl group.

12. The process according to claim 1 comprising from 0.1 to 2% of the amine catalyst which is selected from the group consisting of dimethyl-p-toluidine, diisopropoxy-p-toluidine, N-Ethyl-N-(2-hydroxyethyl)-m-toluidine,N,N-bis-(2-hydroxyethyl)-p-toluidine or 4-dimethylaminobenzoic acid.

13. The process according to claim 1 wherein the photoinitiator is selected from the group consisting of an acyl phosphine oxide and alpha hydroxy ketone.

14. The process according to claim 5 wherein the reactive diluent comprises a hydroxyl group.

15. The process according to claim 4 wherein the reactive polymer, oligomer or prepolymer with acrylate or methacrylate pendant groups is selected from the group consisting of a polyurethane comprising two or more pendant acrylate or methacrylate groups and a (meth)acrylic based polymer comprising acrylate or methacrylate pendant groups formed by reacting acrylic and/or methacrylic ester monomers and at least one of an acrylic monomer and/or methacrylic acid monomer to form a copolymer, then reacting said copolymer with an epoxyalkyl acrylate or methacrylate ester.

16. The process according to claim 15 wherein the coating composition comprises from 1 to 20% of the reactive diluent comprising a hydroxyl group, and/or from 5 to 20% of the non-reactive (meth)acrylate bead polymer.

17. The process according to claim 15 wherein the coating composition comprises
  a) from 25 to 45% of the reactive polymer, oligomer or prepolymer with acrylate or methacrylate pendant groups;
  b) from 25 to 45% of the (meth)acrylate monomer having a boiling point at one atmosphere of greater than 105° C.;
  c) from 15 to 35% of the multifunctional (meth)acrylate functional crosslinker having a boiling point at one atmosphere of greater than 105° C.;
  d) from 1 to 15% of the multifunctional isocyanate;
  e) from 1 to 6% of the thermal and/or photo-initiator;
  f) from 0.2 to 3% of the wax;
  g) from 0.1 to 2% of the inhibitor and/or amine catalyst;
  optionally h) from 2 to 15% of the reactive diluent comprising a hydroxyl group; and
  optionally i) from 5 to 20% of the non-reactive (meth)acrylate bead polymer.

* * * * *